US011597597B2

(12) United States Patent
Austrheim et al.

(10) Patent No.: US 11,597,597 B2
(45) Date of Patent: Mar. 7, 2023

(54) AUTOMATED STORAGE AND RETRIEVAL SYSTEM

(71) Applicant: Autostore Technology AS, Nedre Vats (NO)

(72) Inventors: Trond Austrheim, Etne (NO); Ivar Fjeldheim, Haugesund (NO); Ingvar Fagerland, Kolnes (NO)

(73) Assignee: Autostore Technology AS, Nedre Vats (NO)

( * ) Notice: Subject to any disclaimer, the term of this patent is extended or adjusted under 35 U.S.C. 154(b) by 318 days.

(21) Appl. No.: 16/614,175

(22) PCT Filed: May 16, 2018

(86) PCT No.: PCT/EP2018/062707
§ 371 (c)(1),
(2) Date: Nov. 15, 2019

(87) PCT Pub. No.: WO2018/210923
PCT Pub. Date: Nov. 22, 2018

(65) Prior Publication Data
US 2021/0403237 A1    Dec. 30, 2021

(30) Foreign Application Priority Data

May 16, 2017    (NO) .................................. 20170809

(51) Int. Cl.
*B65G 1/04*    (2006.01)
*B65G 1/06*    (2006.01)
(Continued)

(52) U.S. Cl.
CPC ............... *B65G 1/065* (2013.01); *B61B 5/02* (2013.01); *B65G 1/0464* (2013.01); *B66C 13/00* (2013.01);
(Continued)

(58) Field of Classification Search
CPC .............................. B65G 1/0464; B65G 1/065
See application file for complete search history.

(56) References Cited

U.S. PATENT DOCUMENTS 4,088,232 A    5/1978  Lilly
9,821,959 B2 *  11/2017  Hognaland ............. B60L 15/40
(Continued)

FOREIGN PATENT DOCUMENTS

AU    1225970 A    9/1971
CN    1457304 A    11/2003
(Continued)

OTHER PUBLICATIONS

Office Action in counterpart Japanese Patent Application No. 2019-563360 dated Sep. 10, 2021 (6 pages).
Office Action in counterpart Chinese Patent Application No. 201880039895.6 dated Apr. 13, 2021 (17 pages).
(Continued)

*Primary Examiner* — Jonathan Snelting
(74) *Attorney, Agent, or Firm* — Osha Bergman Watanabe & Burton LLP

(57) ABSTRACT

The present invention relates to automated storage and retrieval system comprising: a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of adjacent tracks of the first set of tracks and a pair of adjacent tracks of the second set of tracks; a plurality of stacks of storage containers arranged in storage columns located beneath the track system, wherein each storage column is
(Continued)

located vertically below a grid opening; a plurality of container handling vehicles for lifting and moving storage containers stacked in the stacks, the container handling vehicles being configured to move laterally on the track system above the storage columns to access the storage containers via the grid openings, wherein each of the plurality of container handling vehicles has a footprint with a horizontal extension which is equal to or less than the horizontal extension of a grid cell and comprises: a wheel assembly for guiding the container handling vehicle along the track system and a container-receiving storage space arranged within the footprint of the container handling vehicle for accommodating a storage container. Each container handling vehicle comprises a protruding section which extends horizontally beyond the footprint of the container handling vehicle and, when the container handling vehicle is positioned above a grid cell, into a neighbouring grid cell.

The present invention also relates to a container handling vehicle for such an automated storage and retrieval system.

11 Claims, 14 Drawing Sheets

(51) Int. Cl.
| | | |
|---|---|---|
| | *B61B 5/02* | (2006.01) |
| | *B66C 13/00* | (2006.01) |
| | *B66C 19/00* | (2006.01) |
| | *B60L 50/64* | (2019.01) |
| | *B60L 53/16* | (2019.01) |
| | *B60L 53/18* | (2019.01) |

(52) U.S. Cl.
CPC .............. *B66C 19/00* (2013.01); *B60L 50/64* (2019.02); *B60L 53/16* (2019.02); *B60L 53/18* (2019.02)

(56) References Cited

U.S. PATENT DOCUMENTS

| 10,497,594 B2* | 12/2019 | Suzuki .............. H01L 21/67733 |
| 10,836,577 B2* | 11/2020 | Fryer .................. B66F 9/07504 |
| 10,882,540 B2* | 1/2021 | Stadie .................... B65G 45/18 |
| 2012/0287532 A1 | 11/2012 | Acevedo et al. |
| 2014/0217977 A1 | 8/2014 | Pastoor et al. |
| 2015/0332213 A1 | 11/2015 | Galluzzo et al. |
| 2016/0325932 A1 | 11/2016 | Hognaland |
| 2021/0155407 A1* | 5/2021 | Austrheim ....... G05B 19/41895 |

FOREIGN PATENT DOCUMENTS

| CN | 105059811 A | 11/2015 |
| CN | 105899398 A | 8/2016 |
| DE | 199 35 742 A1 | 2/2001 |
| ES | 2137021 T3 | 12/1999 |
| GB | 2539562 A | 12/2016 |
| JP | 2013-010633 A | 1/2013 |
| JP | 2016-045805 A | 4/2016 |
| JP | 2016-529181 A | 9/2016 |
| NO | 340 341 B1 | 4/2017 |
| NO | 20160118 A1 | 7/2017 |
| WO | 2013/167907 A1 | 11/2013 |
| WO | 2015/019055 A1 | 2/2015 |
| WO | 2015/104263 A2 | 7/2015 |
| WO | 2015/193278 A1 | 12/2015 |
| WO | 2016/120075 A1 | 8/2016 |

OTHER PUBLICATIONS

Luo Qingsheng et al.; "Design and fabrication of miniature bionic robot"; Beijing Institute of Technology Press, pp. 76-78; Jan. 2016 (5 pages).

International Search Report for corresponding International Application No. PCT/EP2018/062707, dated Aug. 22, 2018 (5 pages).

Written Opinion for corresponding International Application No. PCT/EP2018/062707, dated Aug. 22, 2018 (9 pages).

Search Report issued in Norwegian Application No. 20170809, dated Dec. 15, 2017 (3 pages).

* cited by examiner

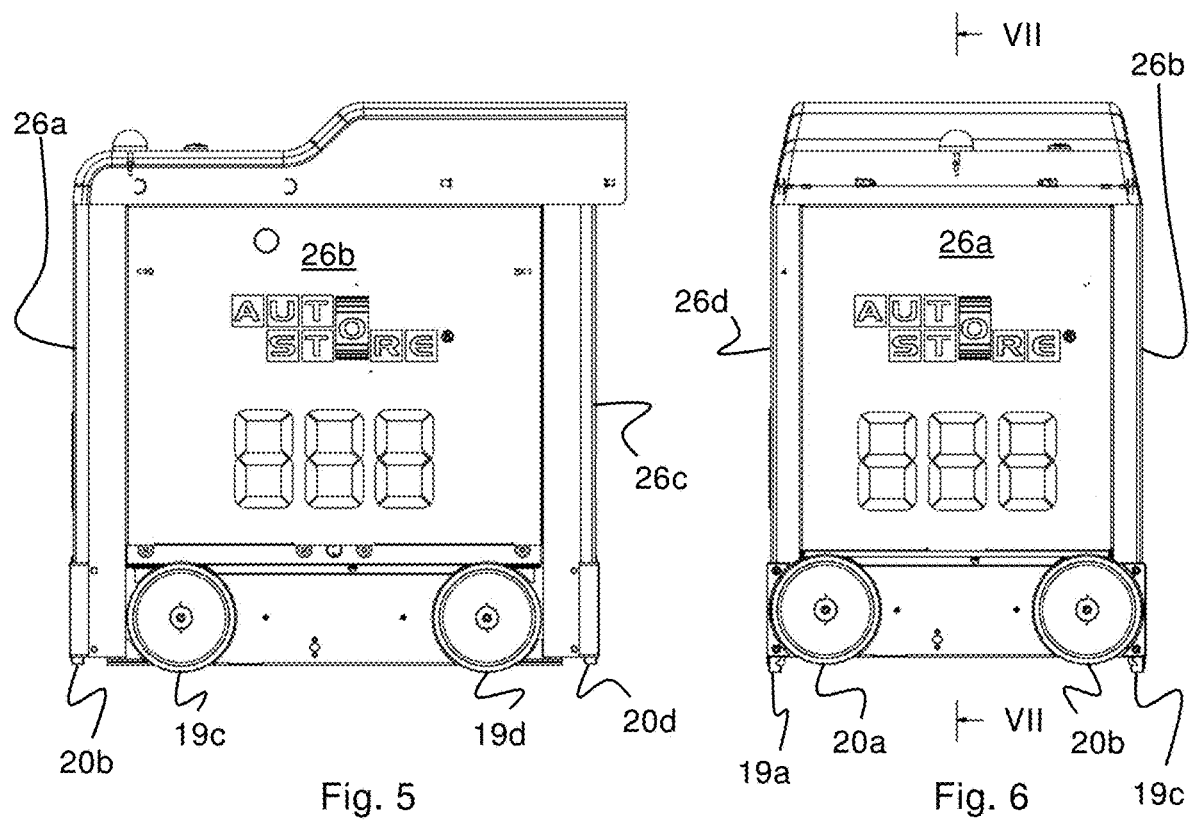
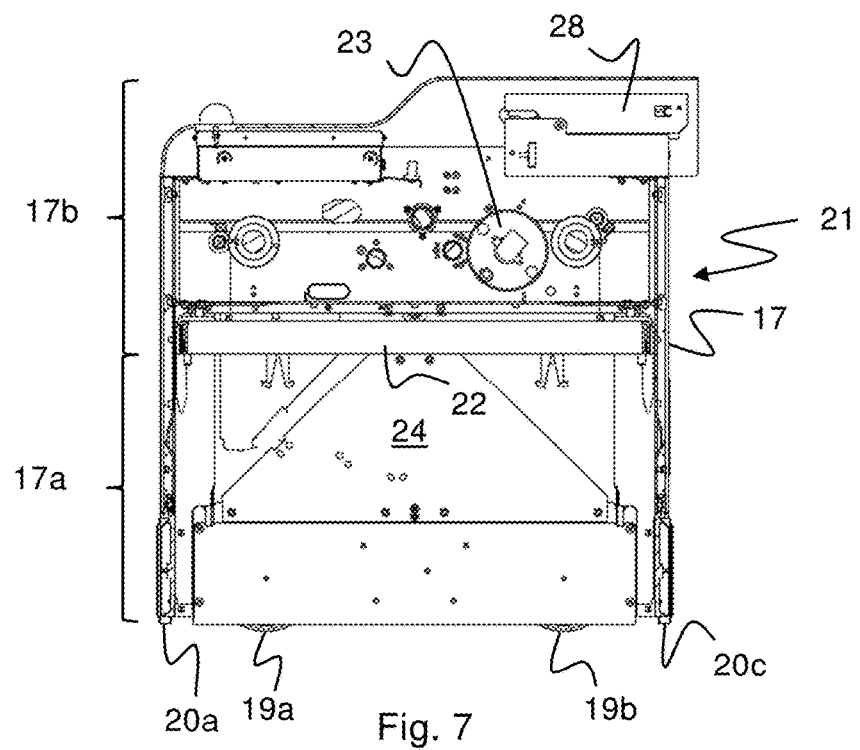

AUTOMATED STORAGE AND RETRIEVAL SYSTEM

TECHNICAL FIELD

The present invention relates to an automated storage and retrieval system.

In particular, the present invention relates to an automated storage and retrieval system comprising:

a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of adjacent tracks of the first set of tracks and a pair of adjacent tracks of the second set of tracks;

a plurality of stacks of storage containers arranged in storage columns located beneath the track system, wherein each storage column is located vertically below a grid opening;

a plurality of container handling vehicles for lifting and moving storage containers stacked in the stacks, the container handling vehicles being configured to move laterally on the track system above the storage columns to access the storage containers via the grid openings, wherein each of the plurality of container handling vehicles has a footprint with a horizontal extent, which is equal to or less than the horizontal extent of a grid cell and comprises:

a wheel assembly for guiding the container handling vehicle along the track system; and a container-receiving storage space arranged centrally within the footprint of the container handling vehicle for accommodating a storage container.

The present invention also relates to a container handling vehicle for such an automated storage and retrieval system, which vehicle comprises a lower part comprising a wheel assembly for guiding the container handling vehicle along a horizontal track system of the automated storage and retrieval system, and a storage space arranged centrally within the lower part for accommodating a storage container of the automated storage and retrieval system.

BACKGROUND AND PRIOR ART

WO2016/120075A1, the contents of which are incorporated herein by reference, shows an example of an automated storage and retrieval system of the type identified above. The disclosed container handling vehicles are dimensioned so that they have a footprint, i.e. a contact area against the track system, which has a horizontal extension that is equal to the horizontal extension of a grid cell.

Within the art, such a container handling vehicle, i.e. a container handling vehicle having a footprint with a horizontal extension corresponding to the horizontal extension of a single grid cell, is sometimes referred to as a "single cell" container handling vehicle.

Another single cell container handling vehicle is disclosed in WO2015/193278A1, the contents of which are incorporated herein by reference.

The single cell design disclosed in WO2016/120075A1 and WO2015/193278A1 reduces the space required for the container handling vehicles to travel on the track system, thus allowing more vehicles to operate on the track system without interfering with each other.

However, the single cell design disclosed in WO2016/120075A1 and WO2015/193278A1 makes it difficult for external equipment to interact with the container handling vehicle. In particular, when the vehicle is powered by an on-board battery, the box-shaped single cell design makes it difficult for charging or battery replacement equipment to access the battery of the vehicle when it needs to be recharged or replaced.

In view of the above, it is desirable to provide an automated storage and retrieval system that solves or at least mitigates the aforementioned problem.

SUMMARY OF THE INVENTION

According to one aspect of the invention, the system is characterised in that each container handling vehicle comprises a protruding section which extends horizontally beyond the footprint of the container handling vehicle and, when the container handling vehicle is positioned above a grid cell, into a neighbouring grid cell.

The vehicle body of the container handling vehicle may comprise a first, lower part or section and a second, upper part or section, which upper part is located above the lower part. The lower part may comprise the wheel assembly for guiding the container handling vehicle along the track system and the container-receiving pace for accommodating a storage container.

The footprint of the container handling vehicle, i.e. the horizontal extent of the lower part of the container handling vehicle, is equal to or less than the horizontal extent of a grid cell.

According to another aspect of the invention, the container handling vehicle is characterised in that it comprises a protruding section extending horizontally beyond the lower part of the vehicle.

It may be advantageous if the protruding section is arranged at the upper part of the container handling vehicle above the lower part.

In a case when the container handling vehicle comprises an on-board rechargeable or replaceable battery, it may be advantageous if the rechargeable or replaceable battery is positioned in the protruding section.

Positioning the battery in the protruding section is advantageous since it allows charging or battery exchange stations easy access to the battery for charging or battery replacement. In particular, if a battery exchange scheme is used, in which case the protruding section comprises a battery compartment or slot, the protruding character of the protruding section provides advantageous guiding for the battery during a battery exchange operation.

The protruding section may also allow larger batteries to be mounted in the vehicles, thus allowing the vehicles operate longer between recharging or battery replacement.

The protruding section may also hold sensors, which may be used to establish the position of the vehicle on the track system, e.g. the alignment of the vehicle vis-à-vis a grid cell, and/or to establish the position of the vehicle vis-à-vis other vehicles on the track system, e.g. when operating the vehicles as a train of vehicles, e.g. as is disclosed in the international patent application PCT/EP2016/077300.

When a vehicle is positioned above a grid cell, e.g. to access a container in the storage column located vertically below the grid cell, the protruding section of the vehicle will extend over a neighbouring grid cell. In other words, even though the vehicle has a footprint, i.e. a contact area against the rail system, which does not extend beyond the horizontal extension of one grid cell, it has a vertical projection which occupies more than one grid cell.

Normally this would prevent a second vehicle from travelling over the neighbouring grid cell, i.e. the grid cell into which the protruding section of the first vehicle extends. This could be a problem since it could reduce the overall capacity of the automated storage and retrieval system.

Therefore, it may be advantageous if the container handling vehicles each comprises a recessed section arranged opposite the protruding section, which recessed section is capable of accommodating the protruding sections of other vehicles when they pass over a neighbouring grid cell.

The recessed section is a region of clearance adapted to provide clearance for and/or temporally accommodate the protruding section of another container handling vehicle when it operates over a neighbouring grid cell, thus allowing two container handling vehicle to operate or pass each other on neighbouring grid cells without contact between the container handling vehicles being made.

The recessed section may have a shape which is complementary to the shape of the protruding section and may extend across the whole width or length of the container handling vehicle, thus allowing vehicles to pass each other over adjacent grid cells. In other words, the recessed section forming the region of clearance may extend from one side of the container handling vehicle to the other. Then, when the vehicles operate on the track system, the recessed section of each container handling vehicle is capable of accommodating the protruding sections of other container handling vehicles when they pass over a neighbouring grid cell, thus allowing container handling vehicles to travel along neighbouring rows of grid cells.

The recessed section may have a shape which is complementary to the shape of the protruding section. However, the recessed section may have a different shape than the protruding section as long as the recessed section is capable of accommodating the protruding section of another vehicle when it passes a neighbouring grid cell.

The recessed section may advantageously extend across the whole width or length of the container handling vehicle in a direction which is orthogonal to the direction in which the protruding section extends, thus allowing two vehicles to completely pass each other on adjacent grid cells.

The protruding section and, if present, also the recessed section may be arranged at the upper part of the container handling vehicle.

The wheel assembly may comprise a first set of wheels for engaging with the first set of tracks to guide movement of the container handling vehicle in the first direction, and a second set of wheels for engaging with the second set of tracks to guide movement of the container handling vehicle in the second direction.

The container handling vehicle may comprise a lifting device arranged to transport a storage container vertically between a storage position in a stack and a transport position in the storage space. The lifting device may comprise a gripping device being configured to releasably grip a storage container and a lifting motor being configured to raise and lower the gripping device relative to the storage space.

The protruding section may comprise at least one of: a rechargeable battery; a battery slot for housing a replaceable battery; and a sensor for establishing the position of the vehicle on the track system or vis-à-vis other vehicles on the track system.

The wheel assembly may comprise wheels which are arranged around the periphery of the storage space.

In the following, numerous specific details are introduced by way of example only to provide a thorough understanding of embodiments of the claimed system and vehicle. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention.

FIG. 5 is a first side view of the container handling vehicle according to FIG. 4.

FIG. 6 is a second side view of the container handling vehicle according to FIG. 4.

FIG. 7 is a sectional view of the container handling vehicle from the direction indicated by VII-VII in FIG. 6.

In the drawings, like reference numerals have been used to indicate like parts, elements or features unless otherwise explicitly stated or implicitly understood from the context.

DETAILED DESCRIPTION OF THE INVENTION

Figure 1:
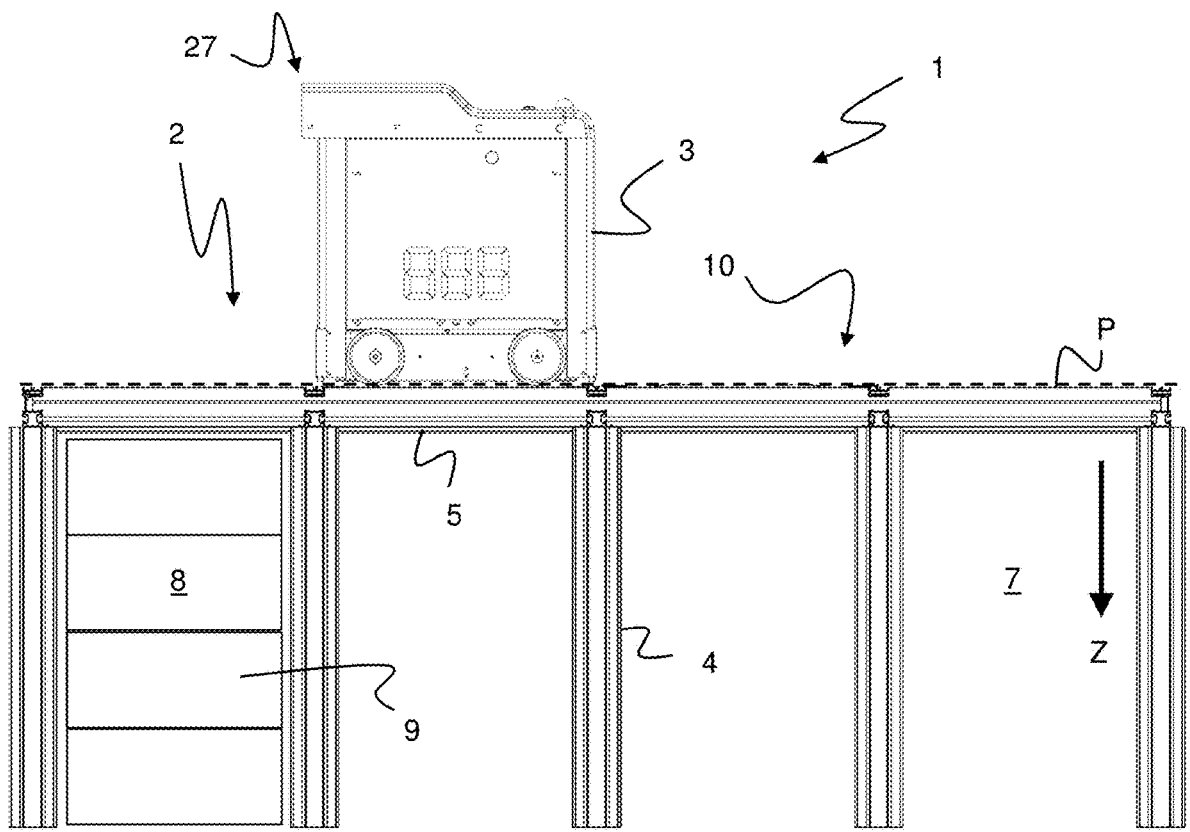
FIG. 1 is a side view of an automated storage and retrieval system according to the invention.

In the following, embodiments of the invention will be discussed in more detail by way of example only and with reference to the appended drawings. It should be understood, however, that the drawings are not intended to limit the invention to the subject-matter depicted in the drawings.

An embodiment of a storage structure of an automated storage and retrieval system 1 according to the invention will now be discussed in more detail with reference to FIGS. 1 to 3.

The storage structure comprises a framework 2 on which a plurality of container handling vehicles 3 are operated (in FIG. 1 only one vehicle 3 is shown).

The framework 2 comprises a plurality of upright members 4 and a plurality of horizontal members 5, which are supported by the upright members 4. The members 4, 5 may typically be made of metal, e.g. extruded aluminium profiles.

The framework 2 defines a three-dimensional storage grid comprising storage columns 7 arranged in rows, in which storage columns 7 storage containers 8, also known as bins, are stacked one on top of another to form stacks 9. Each storage container 8 may typically hold a plurality of product items (not shown), and the product items within a storage container 8 may be identical, or may be of different product types depending on the application of the system 1. The framework 2 guards against horizontal movement of the stacks 9 of storage containers 8, and guides vertical movement of the containers 8, but does normally not otherwise support the storage containers 8 when stacked.

The horizontal members 5 comprise a rail or track system 10 arranged in a horizontal plane P above the storage columns 7, on which track system 10 the plurality of container handling vehicles 3 can move laterally above the storage columns 7 to raise storage containers 8 from and lower storage containers 8 into the storage columns 7, and also to transport the storage containers 8 above the storage columns 7.

The track system 10 comprises a first set of parallel rails or tracks 11 arranged to guide movement of the container handling vehicles 3 in a first direction X, and a second set of parallel rails or tracks 12 arranged perpendicular to the first set of tracks 11 to guide movement of the container handling vehicles 3 in a second direction Y, which is perpendicular to the first direction X.

Figure 2:
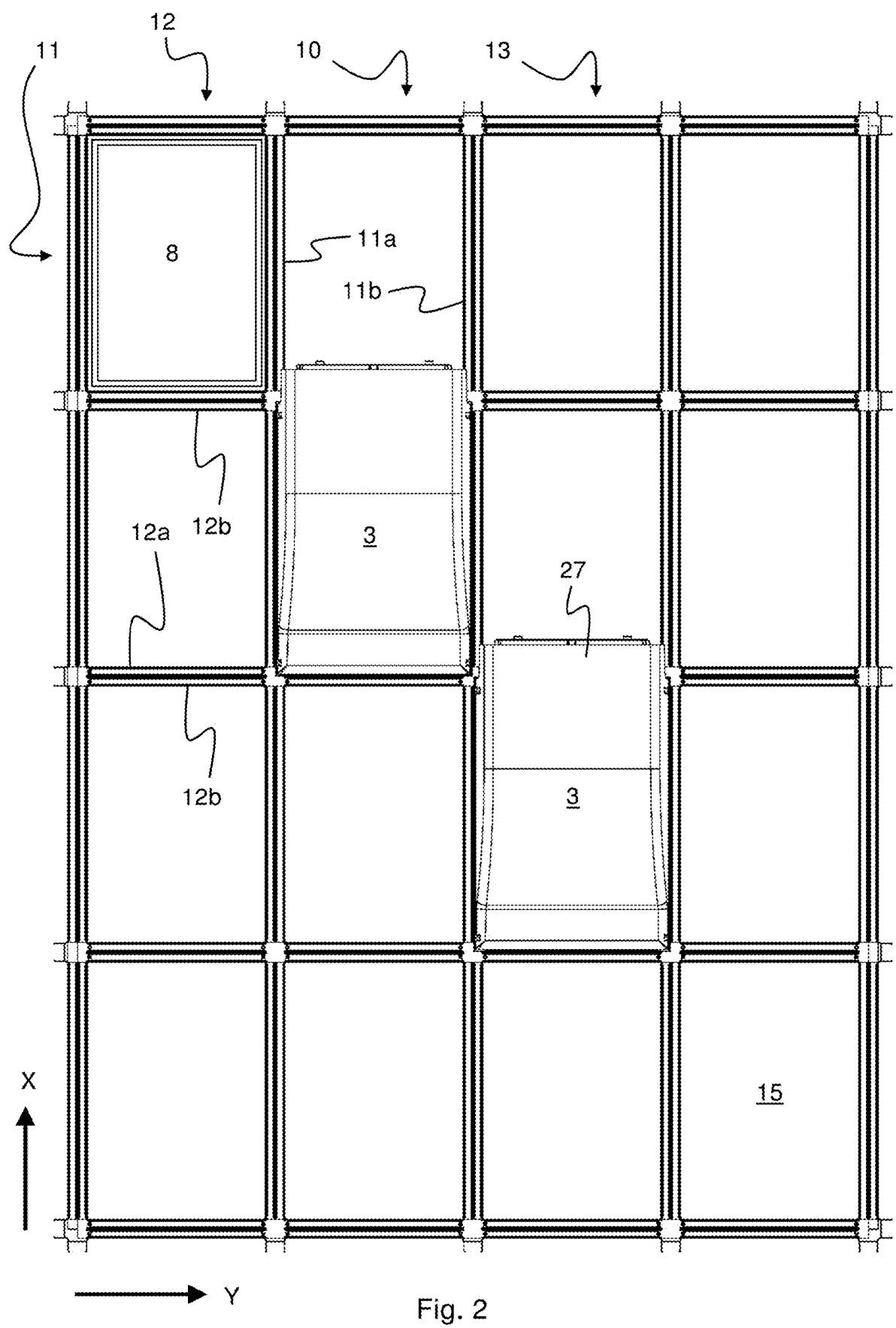
FIG. 2 is a top view of a track system of the automated storage and retrieval system according to FIG. 1.
Figure 3:
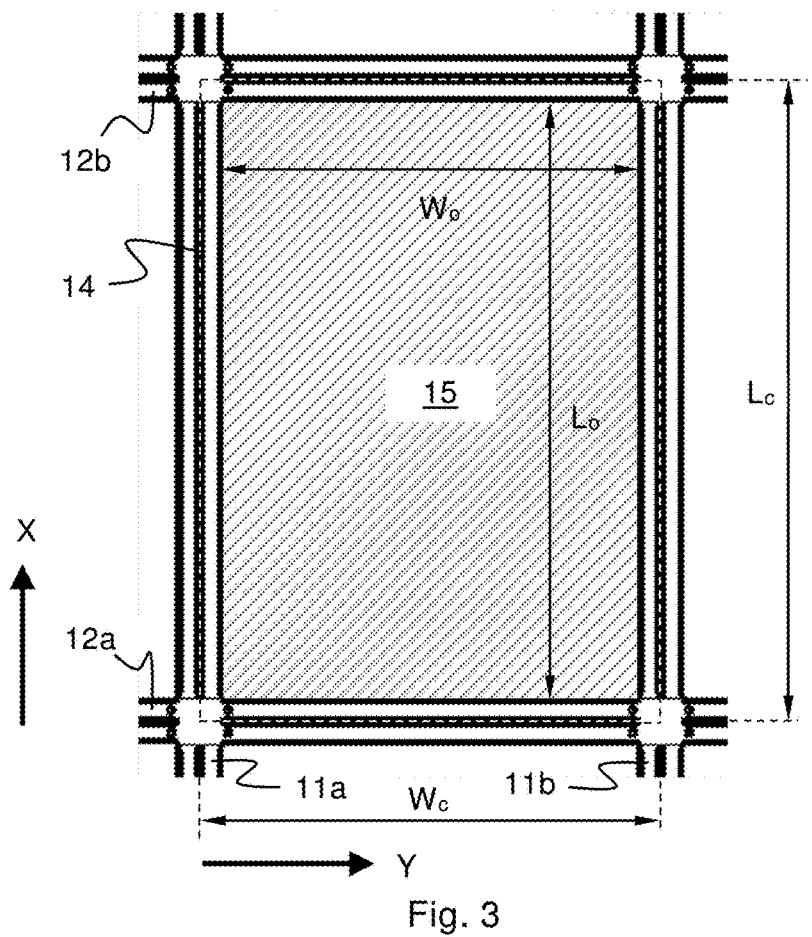
FIG. 3 shows a grid cell of the track system of FIG. 2.

The track system 10 forms a grid structure or grid pattern 13 in the horizontal plane P (see FIGS. 2 and 3). The grid pattern 13 comprises a plurality of rectangular and uniform grid locations or grid cells 14, where each grid cell 14 comprises a grid opening 15 which is delimited by a pair of tracks 11a, 11b of the first set of tracks 11 and a pair of tracks 12a, 12b of the second set of tracks 12. In FIG. 3, the grid cell 14 is indicated by a box having dashed borders and the grid opening 15 is indicated by a hatched area.

Consequently, tracks 11a and 11b form pairs of tracks defining parallel rows of grid cells running in the X direction, and tracks 12a and 12b form pairs of tracks defining parallel rows of grid cells running in the Y direction.

Each grid cell 14 has a width We which is typically within the interval of 30 to 150 cm, and a length $L_c$ which is typically within the interval of 50 to 200 cm. Each grid opening 15 has a width $W_o$ and a length $L_o$ which is typically 2 to 10 cm less than the width $W_c$ and the length $L_c$, respectively, of the grid cell 14.

In the X and Y directions, neighbouring grid cells are arranged in contact with each other such that there is no space there-between.

One embodiment of a container handling vehicle 3 according to the invention will now be discussed in more detail with additional reference to FIGS. 4 to 7.

Each container handling vehicle 3 comprises a vehicle body 17 and a wheel assembly 18 arranged in a lower section or part 17a (see FIG. 7) of the vehicle body 17 to enable the lateral movement of the container handling vehicle 3, i.e. the movement of the vehicle 3 in the X and Y directions (see FIG. 2).

The wheel assembly 18 comprises a first set of wheels 19, which is arranged to engage with a pair of tracks 11a, 11b of the first set of tracks 11, and a second set of wheels 20, which is arranged to engage with a pair of tracks 12a, 12b of the second set of tracks 12. At least one of the set of wheels 19, 20 can be lifted and lowered, so that the first set of wheels 19 and/or the second set of wheels 20 can be brought to engage with the respective set of tracks 11, 12 at any one time.

Each set of wheels 19, 20 comprises four wheels 19a, 19b, 19c, 19d; 20a, 20b, 20c, 20d arranged along the sides of the vehicle (see FIGS. 5 to 7). Wheels 19a and 19b are arranged in a first vertical plane, and wheels 19c and 19d are arranged in a second vertical plane which is parallel to the first vertical plane and arranged at a distance from the first vertical plane which corresponds to the distance between rails 11a and 11b (see FIG. 3). Wheels 20a and 20b are arranged in a third vertical plane, which is orthogonal to the vertical planes in which wheels 19a-19d are arranged, and wheels 20c and 20d are arranged in a fourth vertical plane which is parallel to the third vertical plane and arranged at a distance from the third vertical plane which corresponds to the distance between rails 12a and 12b.

At least one of the wheels in each set 19, 20 is motorized in order to propel the vehicle 3 along the track system 10. Advantageously, the at least one motorized wheel in each set comprises a hub motor, i.e. an electric motor that is coupled to, or incorporated into, the hub of a wheel and drives the wheel directly. An example of a container handling vehicle with such a motor is disclosed in WO2016/120075A1, the contents of which are incorporated herein by reference.

Each container handling vehicle 3 comprises a storage compartment or storage space 24 (see FIG. 7) arranged centrally within the lower part of the vehicle body 17 for receiving and holding a storage container 8 when transporting the storage container 8 across the track system 10. The storage space 24 is arranged within the vehicle body 17 and can be accessed from below, i.e. from an opening (not shown) underneath the container handling vehicle 3.

Each container handling vehicle 3 also comprises a lifting device 21 (see FIG. 7) for vertical transportation of a storage container 8, e.g. lifting a storage container 8 from a storage column 7 and bringing it into the storage space 24, and also for lowering a storage container 8 from the storage space 24 into a storage column 7. The lifting device 21 comprises a latching or gripping device 22 which is arranged to releasably engage with a storage container 8. The lifting device 21 also comprises a lifting motor 23 for lowering and raising the gripping device 22 so that the position of the gripping device 22 with respect to the vehicle body 17 can be adjusted in a third direction Z (see FIG. 1), which is orthogonal to the first direction X and the second direction Y.

Conventionally, and also for the purpose of this application, Z=1 identifies the uppermost layer of the storage grid, i.e. the layer immediately below the track system 10, Z=2 identifies the second layer below the track system 10, Z=3 identifies the third layer etc. The container handling vehicles 3 can be said to travel in layer Z=0. Consequently, each storage column can be identified by its X and Y coordinates, and each storage position in the storage grid can be identified by its X, Y and Z coordinates.

The lifting motor 23 is arranged in a second, upper part or section 17b of the vehicle body 17 (see FIG. 7), which upper part 17b is located above the lower part 17a. When a storage container 8 stored in the storage grid is to be accessed, one of the container handling vehicles 3 is instructed to retrieve the target storage container 8 from its position in the storage grid and to transport the target storage container 8 to an access station (not shown) where it can be access from outside of the storage grid or transferred out of the storage grid. This operation involves moving the container handling vehicle 3 to the grid cell 14 above the storage column 7 in which the target storage container is positioned and retrieving the storage container from the storage column 7 using the container handling vehicle's lifting device 21. This step involves using the lifting device 21 to lift the storage container from the storage column 7 through the grid opening 15 of the grid cell 14 and into the storage space 24 of the vehicle 3.

If the target storage container is located deep within a stack 9, i.e. with one or a plurality of other storage containers positioned above the target storage container, the operation also involves temporarily moving the above-positioned storage containers prior to lifting the target storage container from the storage column 7. This step, which is sometimes referred to as "digging" within the art, may be performed with the same container handling vehicle that is subsequently used for transporting the target storage container to the access station, or with one or a plurality of other cooperating container handling vehicles. Alternatively, or in addition, the automated storage and retrieval system may have container handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

Once the target storage container has been brought into the storage space 24 of the container handling vehicle 3, the vehicle transports the storage container to the access station where it is unloaded. The access station may typically comprise a grid location at the periphery of the storage grid where the storage container can be accessed manually or transported further using a suitable conveyor system.

When a storage container 8 is to be stored in the storage grid, one of the container handling vehicles 3 is instructed to pick up the storage container from a pick-up station (not shown), which may also double as an access station, and transport it to a grid cell above the storage column 7 where it is to be stored. After any storage containers positioned at or above the target position within the storage column stack have been removed, the container handling vehicle 3 positions the storage container at the desired position. The removed storage containers may then be lowered back into the storage column 7, or relocated to other storage columns within the storage grid.

For monitoring and controlling the automated storage and retrieval system so that a desired storage container can be delivered to the desired location at the desired time without the container handling vehicles 3 colliding with each other, the automated storage and retrieval system comprises a control system (not shown), which typically is computerised and comprises a database for monitoring and controlling e.g. the location of the respective storage containers 8 within the storage grid, the content of each storage container 8 and the movement of the container handling vehicles 3.

The container handling vehicles 3 typically communicates with the control system via wireless communication means, e.g. via a WLAN operating under an IEEE 802.11 (WiFi) standard and/or via a mobile telecommunication technology such as 4G or higher.

Each container handling vehicle 3 comprises a battery 25 (see FIG. 4) which provides power to onboard equipment, including the motorised wheels, the lifting motor and onboard control and communications systems.

Each container handling vehicle 3 has a footprint, i.e. a contact area against the track system 10, which has a horizontal extension which is equal to or less than the horizontal extension of a grid cell 14. In other words, when the vehicle 3 is positioned above a grid cell 14, e.g. for lifting a storage container from or lowering a container into a storage column 7, the footprint of the vehicle 3 will not extend beyond the grid cell into a neighbouring grid cell.

The wheels 19a-19d, 20a-20d are arranged around the periphery of the storage space 24, and the footprint 14 of the vehicle 3 is larger than the storage space 24 only enough to accommodate the wheels 19a-19d, 20a-20d. In this way, the footprint 14 of the vehicle 3 takes up the minimum possible amount of space in the X-Y plane. Since the storage space 24 is positioned between the pair of wheels 19a-19d, 20a-20d on each side of the vehicle 3, the centre of gravity of the vehicle 3 will be located within the footprint 14 even when a storage bin is raised into the storage space 24.

Further, the vehicle 3 comprises generally vertical side walls 26a-26d (see FIGS. 5 to 7), which are co-planar to the vertical planes in which the wheels 19a-19d; 20a-20d are arranged. Consequently, the lower part 17a of the container handling vehicle 3 has a generally cuboid shape.

Figure 4:
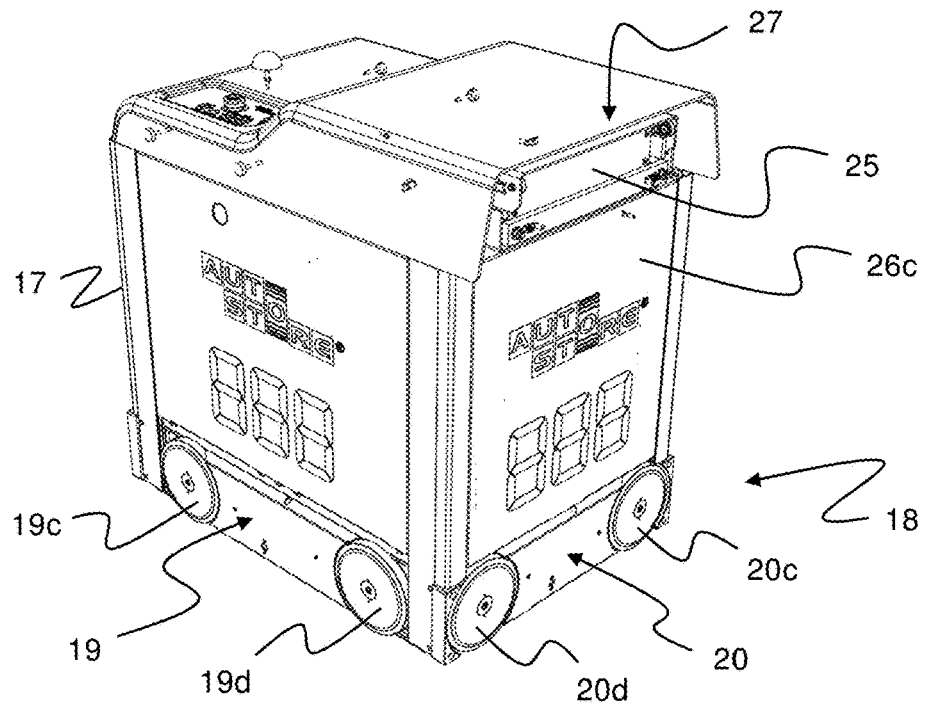
FIG. 4 is perspective view of a container handling vehicle operating on the automated storage and retrieval system according to FIG. 1.
Figure 8:
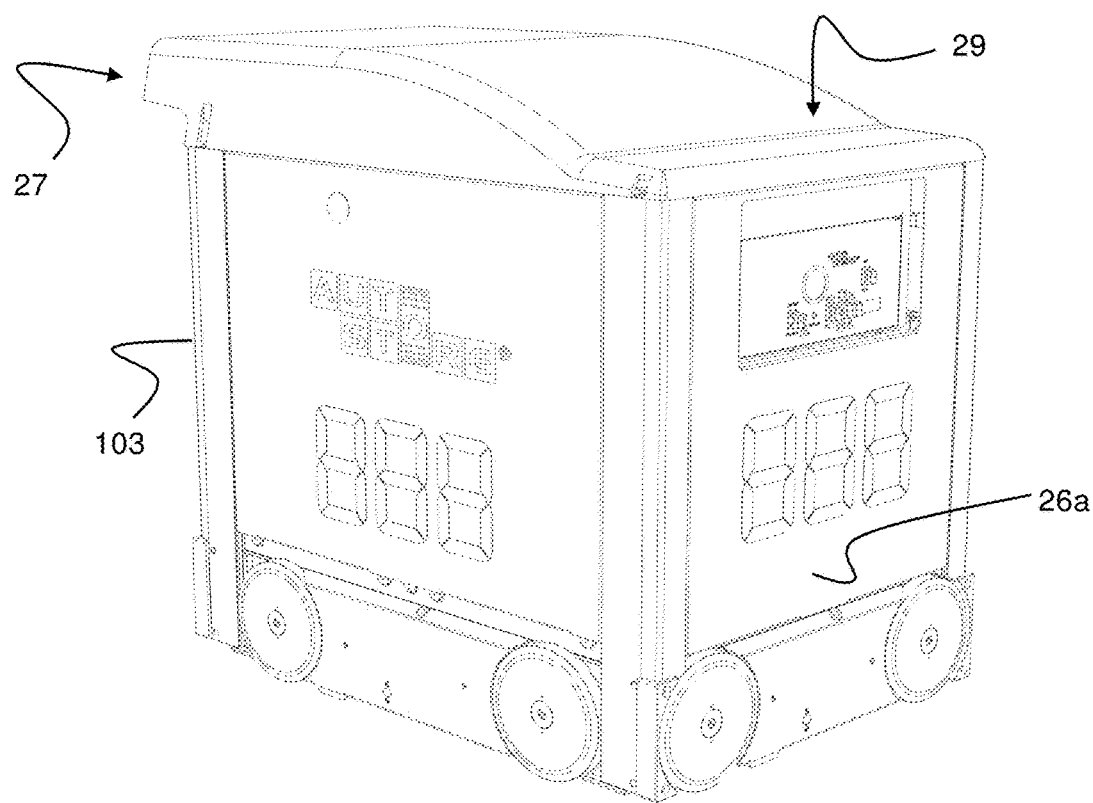
FIG. 8 is a perspective view of a second embodiment of a container handling vehicle.

However, the upper part 17b of the vehicle 3 has a protruding section 27 which extends horizontally in the X direction beyond the otherwise generally vertical side wall 26c (e.g. see FIGS. 1 and 4). This section 27 houses the battery 25 of the vehicle 3. Positioning the battery in this manner is advantageous since it allows charging or battery exchange stations easy access to the battery for charging or battery replacement. In particular, if a battery exchange scheme is used, in which case the protruding section 27 comprises a battery compartment or slot 28 (e.g. see FIG. 12), the protruding character of section 27 provides advantageous guiding for the battery 25 during battery exchange operation.

The protruding section 27 also allows larger batteries to be mounted in the vehicle and may also be beneficial when operating the vehicles as a train of vehicles, e.g. as is disclosed in the international patent application PCT/EP2016/077300.

Alternatively, or in addition, the protruding section 27 may hold downward-looking sensors, which may be used to establish the position of the vehicle on the track system 10, e.g. the alignment of the vehicle vis-à-vis a grid cell 14, or to establish the position of the vehicle vis-à-vis other vehicles on the track system 10, e.g. when operating the vehicles as a train of vehicles.

When the vehicle 3 is positioned above a grid cell 14, e.g. to access a container 8 in the storage column 7 located vertically below the grid cell 14, the protruding section 27 will extend over a neighbouring grid cell. In other words, even though the vehicle 3 has a contact area against the rail system 10 which does not extend beyond the horizontal extent of one grid cell 14, it has a vertical projection which occupies more than one grid cell.

This will prevent a second vehicle from travelling over the neighbouring grid cell, i.e. the grid cell into which the protruding section 27 of the first vehicle extends. This could be a problem since it could reduce the overall capacity of the automated storage and retrieval system.

FIGS. 8 to 11 disclose an alternative embodiment of a container handling vehicle 103 which comprises a recessed section 29 which is arranged in the upper part 17b opposite to the protruding section 27. In other words, the protruding section 27 and the recessed section 29 are arranged at opposite sides of the container handling vehicle 103. The recessed section 29 is capable of accommodating the protruding sections 27 of other vehicles when they pass over a neighbouring grid cell. In particular, the recessed section 29 has a shape which is complementary to the shape of the protruding section 27 and extends across the whole width of the container handling vehicle 103 in the Y direction, thus allowing vehicles 103 to pass each other over adjacent grid cells.

Figure 9:
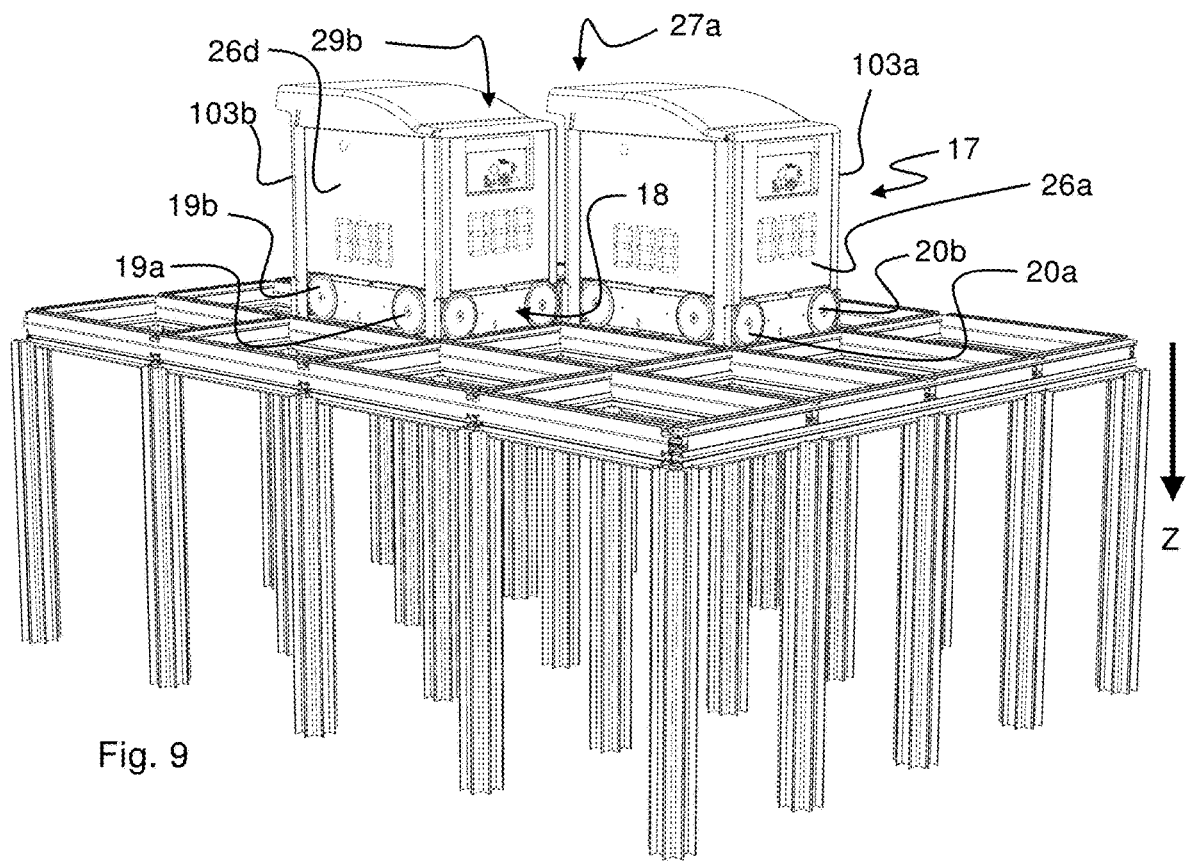
FIGS. 9 to 11 show container handling vehicles according to FIG. 8 operating over grid cells of an automated storage and retrieval system.
Figure 10:
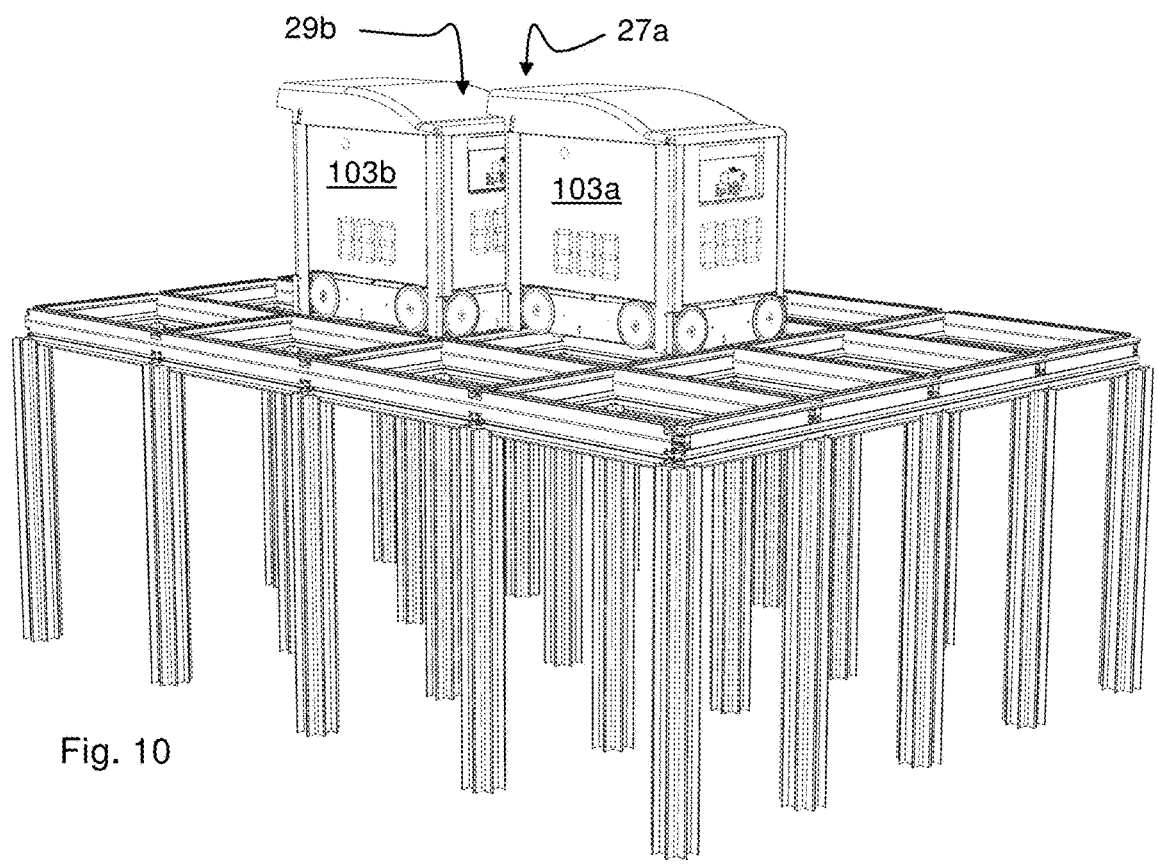
Figure 11:
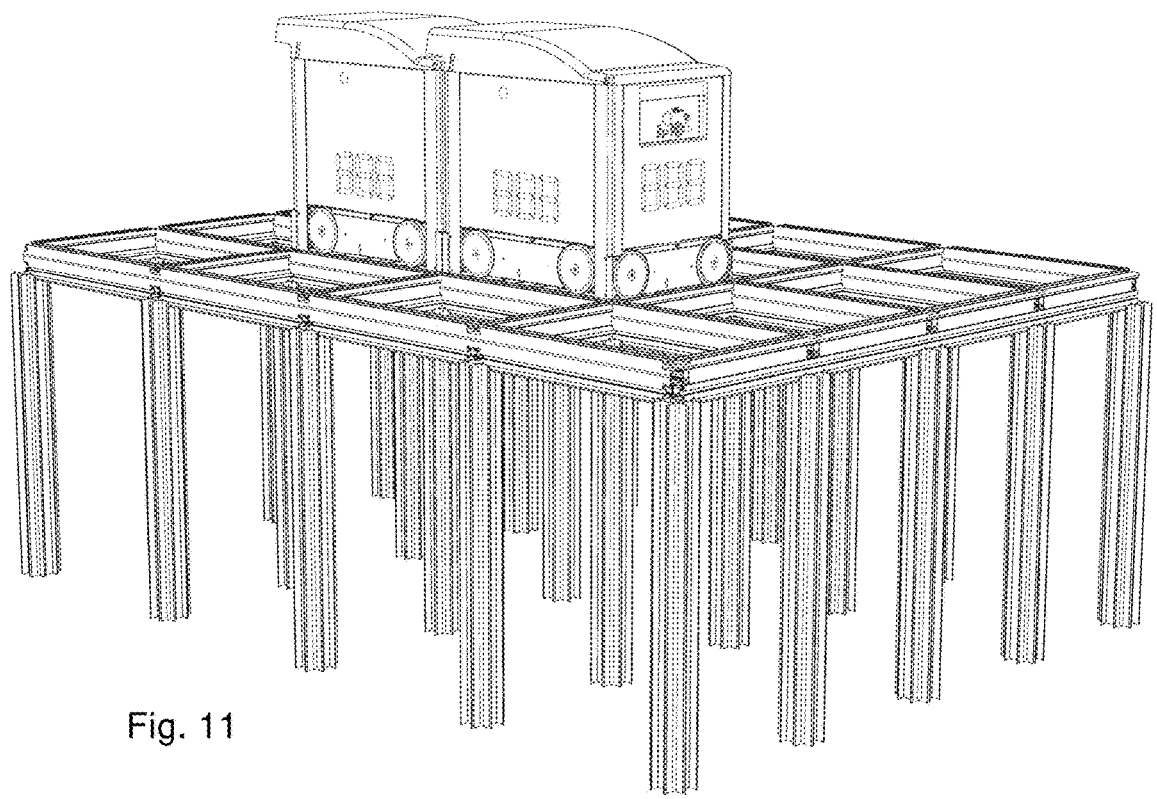

This is illustrated in FIGS. 9 to 11, which show a first vehicle 103a moving in to operate over a grid cell while a second vehicle 3b is positioned over a neighbouring grid cell while the protruding section 27a of the first vehicle 103a is accommodated in the recessed section 29b of the second vehicle 103b.

In the disclosed embodiment, the protruding section 27 of each container handling vehicle 103 extends in the X direction and the recessed section 29 extends across the whole width of the vehicle 103 in the Y direction. However, it is understood that the protruding section may alternatively extend in the Y direction and the recessed section extend across the whole width of the vehicle in the X direction.

Figure 12:
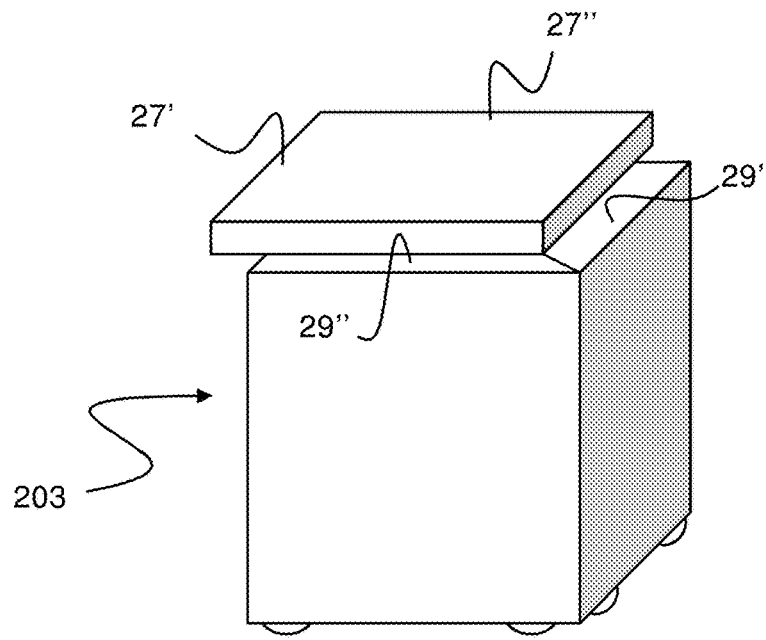
FIG. 12 is a perspective view schematically showing an alternative embodiment of a container handling vehicle according to the invention.

Each container handling vehicle may alternatively have two protruding sections 27', 27" extending in two orthogonal directions and two opposite, complementary recessed sections 29', 29", as is schematically illustrated by the container handling vehicle 203 shown in FIG. 12. This configuration will also allow two vehicles to operate over neighbouring grid cells without the protruding sections 27' and 27" hindering the movement of other vehicles on the track system.

In the track system 10 shown in FIG. 2, each horizontal member making up the tracks comprises two tracks. Consequently, each horizontal member is capable of accommodating two wheels in parallel. In such a track system, the borders between neighbouring grid cells run along the centre-line of the horizontal members, as is indicated in FIG. 2.

Figure 13:
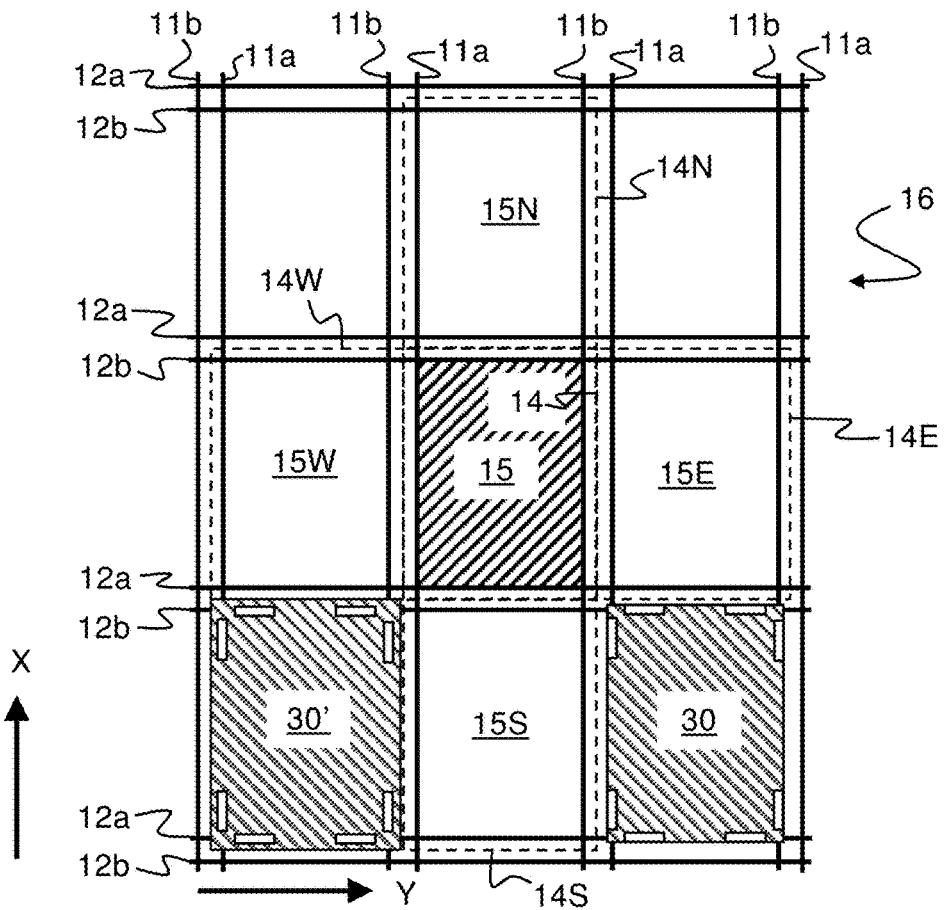
FIG. 13 is a top view of an alternative track system of an automated storage and retrieval system according to the invention.

FIG. 13 shows an alternative rail or track system 16 which is made up by elongated members each forming a single track, i.e. a track configured to accommodate only one wheel. In such a track system the borders between neighbouring grid cells run midway between neighbouring elongated members forming the single tracks.

In FIG. 9, grid cell 14 comprises a grid opening 15. To the left (West) of grid cell 14, there is an adjacent grid cell 14W comprising a grid opening 15W. Likewise, to the right (East) of grid cell 14, there is an adjacent grid cell 14E comprising a grid opening 15E. Also, below grid cell 14 (South), there is an adjacent grid cell 14S comprising a grid opening 15S, and above grid cell 14 (North), there is an adjacent grid cell 14N comprising a grid opening 15N.

In FIG. 13, a footprint 30 of a container handling vehicle is schematically illustrated. In this embodiment the footprint 30 is defined by the horizontal extension of the wheels of the vehicle. As is evident from the figure, the footprint 30 has a horizontal extension which is less than the horizontal extension of a grid cell.

In FIG. 13, a footprint 30' of a container handling vehicle according to an alternative embodiment is also schematically illustrated. In this case the lower part of the vehicle extends beyond the wheels and the footprint 30' has a horizontal extension which is equal to than the horizontal extension of a grid cell.

As previously mentioned, the protruding section 27 may comprise a battery compartment or slot 28 for a rechargeable or a replaceable battery 25. In the following, such an embodiment and an associated battery exchange scheme will be discussed in more detail with reference to FIGS. 14 to 19.

Figure 14:
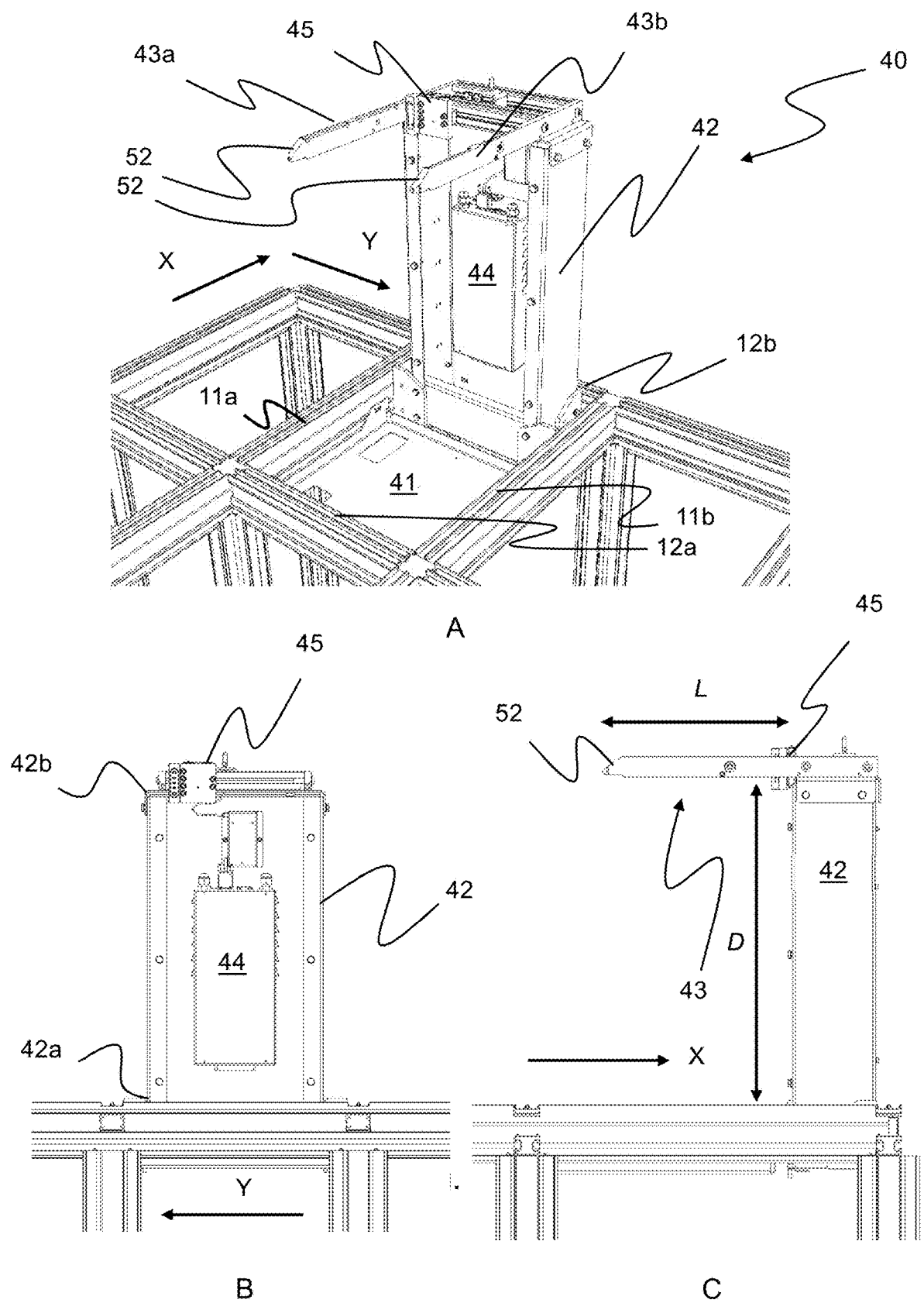
FIGS. 14 to 19 show an embodiment of a container handling vehicle interacting with a charging and/or battery exchange station of an automated storage and retrieval system.

An example of a charging and/or battery exchange station 40, hereinafter referred to as a charging station, is shown in FIG. 14, both in a perspective view (FIG. 14 A) and in side views along X direction (FIG. 14 B) and along Y direction (FIG. 14 C).

The charging station 40 is mounted on a charging station base plate 41, which is fixed (directly or indirectly) to neighbouring rails 11a,11b,12a,12b of the track system above a grid column at or near the perimeter of the framework structure. The particular grid column containing the charging station 40 will hereinafter be referred to as a charging station cell.

The charging station 40 shown comprises a vertical charging station column 42 fixed at a lower end 42a to the based plate 41. A charging socket 45 is arranged at or near an upper end 42b of the column 42, i.e. opposite to the lower end 42a, and electrically connected to a power supply 44, possibly via a power transformer transforming the charging power to the desired power level.

Figure 18:
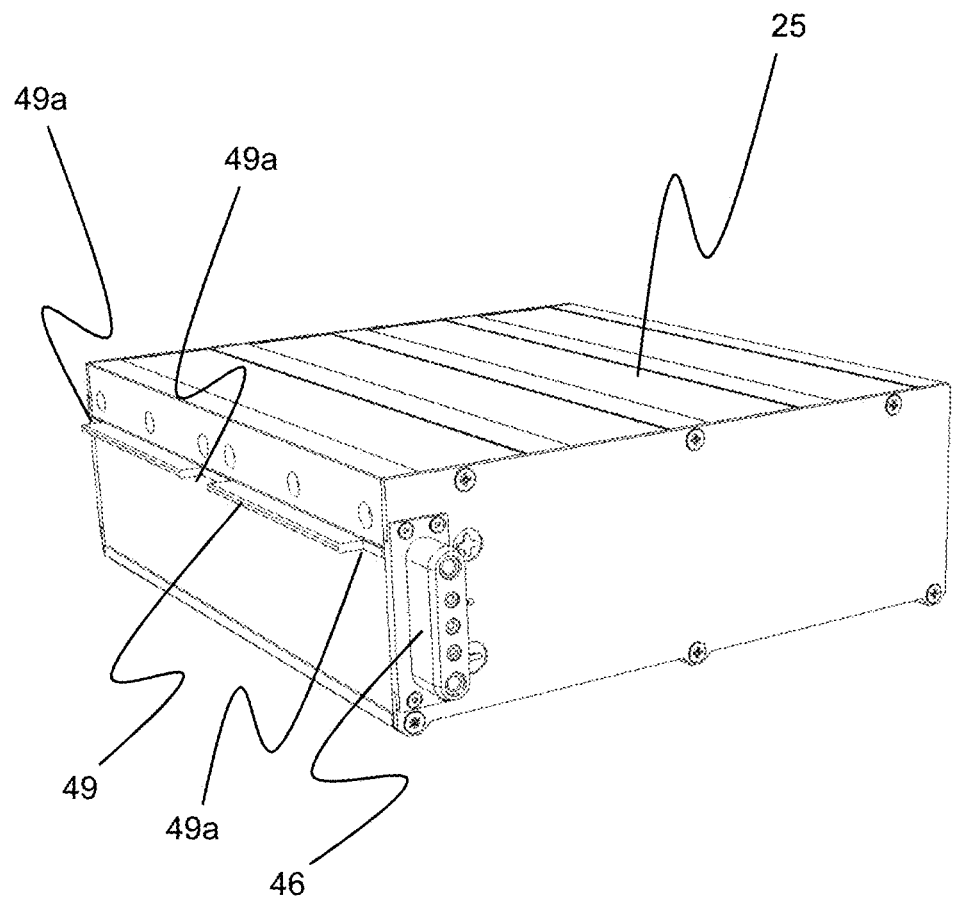

The charging socket 45 is further configured to receive a charging plug 46 of the battery 25 installed on each vehicle 3 (see. FIG. 18), thereby allowing flow of electric power when the charging plug 46 is electrically coupled to the charging socket 45.

In a preferred configuration, the charging socket 45 is resiliently attached to the charging station 42, for example such that the position of the charging socket 45 is fixed in an upper (unloaded) position when no external force act on the charging socket 45 and in a lower (loaded) position when the charging socket is exposed to the weight of the electrically connected battery 25.

The charging socket 45 and the charging plug 46 may of course be interchanged.

In general, any kind of disconnectable electrical connections between the charging station 40 and the battery 25 is possible.

An automated storage and retrieval system as described herein may comprise a plurality of such charging stations 40, typically arranged along the perimeter of the track system. However, one or more charging stations 40 may alternatively or additionally be placed further into the track system and/or fully outside of the track system. In the latter configuration, the charging station(s) 40 should be connected to the track system by additional rails in order to allow the vehicles 3 to travel to their respective charging station 40.

One possible battery exchange process will now be described with particular reference to FIGS. 15 to 17.

A vehicle 3, having transferred its discharged, or partly discharged, main battery from its battery compartment or slot within a battery cover 31 to a first charging station for charging, approaches a second charging station 40 containing a charged, or partly charged, main battery 25 (see FIG. 15A and FIG. 16C).

To allow the vehicle to enter the charging station storage cell, the first set of wheels 19a-d should contact the underlying track system (see FIG. 15 A-D) and the second set of wheels 20a-d closest to the charging station 30 should be sufficiently high above the track system in order not to interfere with the tracks along the Y direction.

When wheels 20c and 20d of the second set of have entered the charging station storage cell, and prior to reaching the horizontal position where the charging station 40 is contacting the approaching vehicle 3, the vehicle 3 is lowered towards the track system. The lowering is performed to allow correct alignments with the main battery 25 during the battery exchange process since the weight of the battery 25 forces the charging socket 45 down to its lower (loaded) position as explained above. A lowering of the vehicle 3 also increases the overall stability of the exchange procedure. Typical vertical displacement of the vehicle 3 is 5-15 mm, for example 10 mm.

The charging station 40 should thus be configured such that the height of the main battery 25 under charge, relative to the track system, is approximately equal to the corresponding height of the battery compartment on the vehicle 3 when the vehicle 3 is in a lowered position.

To allow movements of the vehicle 3 being void of a main battery 25, an auxiliary battery may be installed, for example in the same or similar way as disclosed in the patent publication WO 2015/104263 A1, the contents of which are incorporated herein by reference. Other solutions may also be envisaged, for example use of external power sources such as live rails, manual interference, etc.

Alternative embodiments in which either the charging station 40 or the vehicle 3 or a combination of both contain a plurality of batteries, thereby avoiding the need of vehicle movements between charging stations 40 during battery exchange. A multi-battery charging station applicable for the above mentioned storage system 1 is disclosed in WO 2017/220627 A1, the contents of which are incorporated herein by reference.

Figure 15:
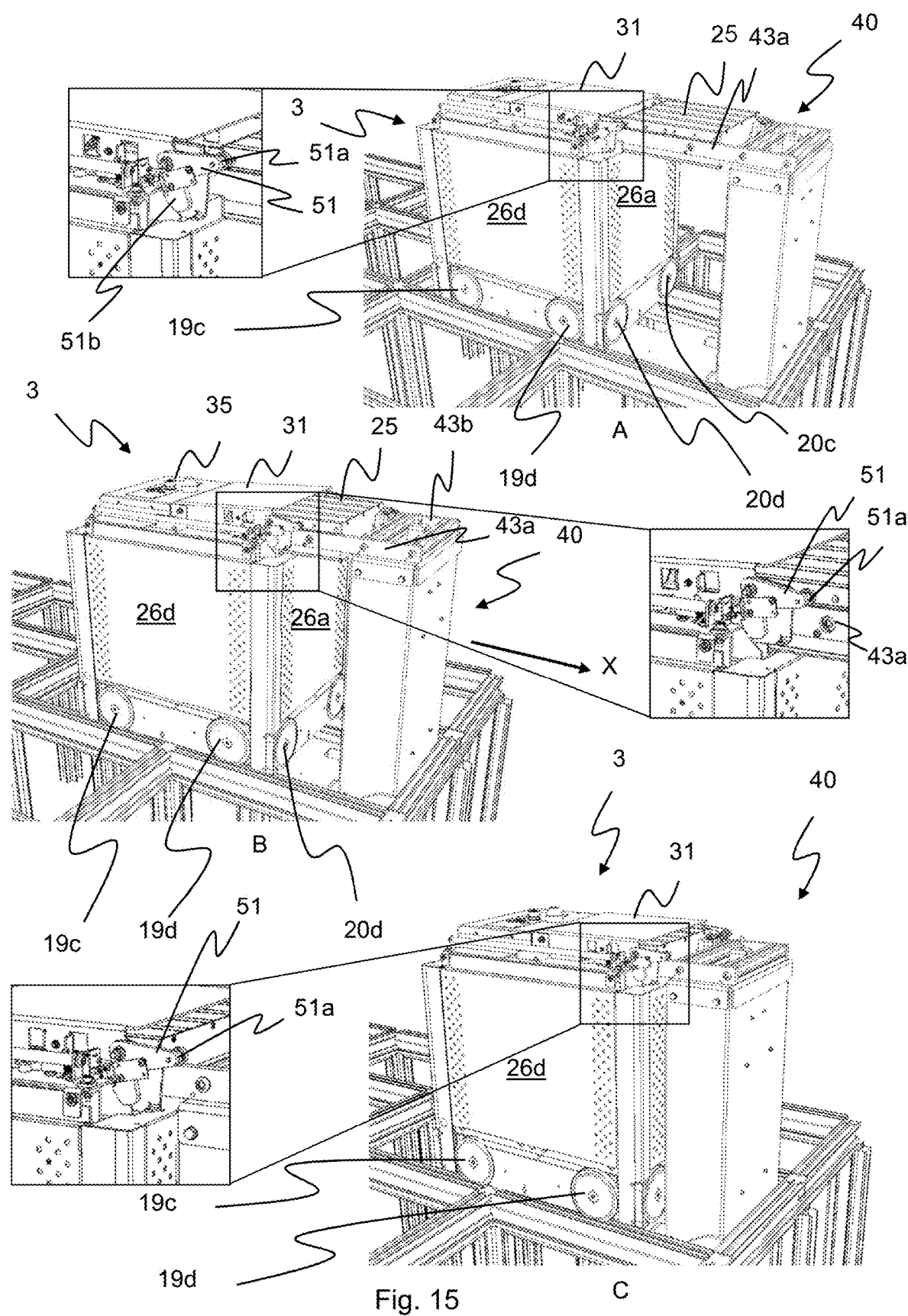
Figure 15:
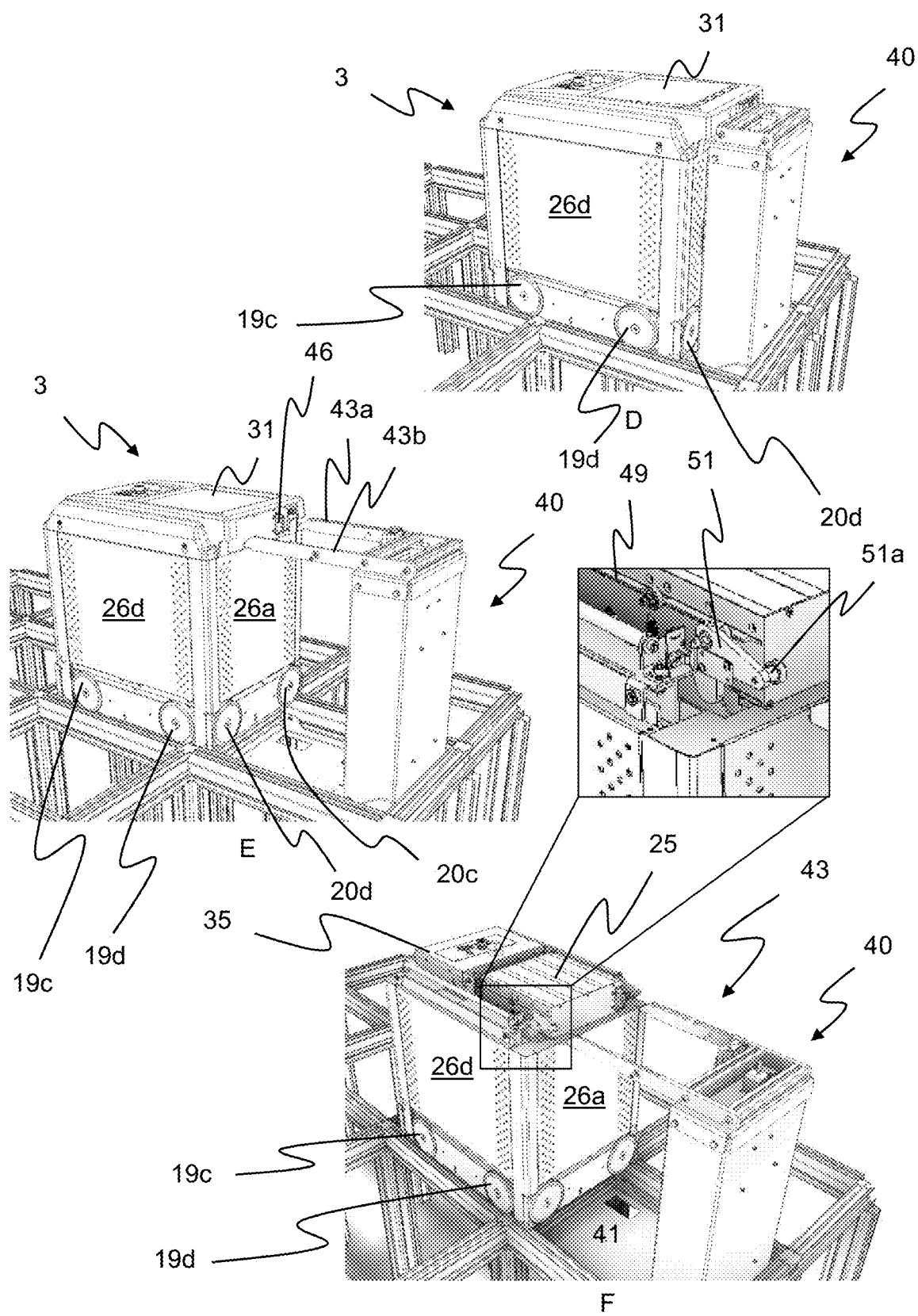
Figure 16:
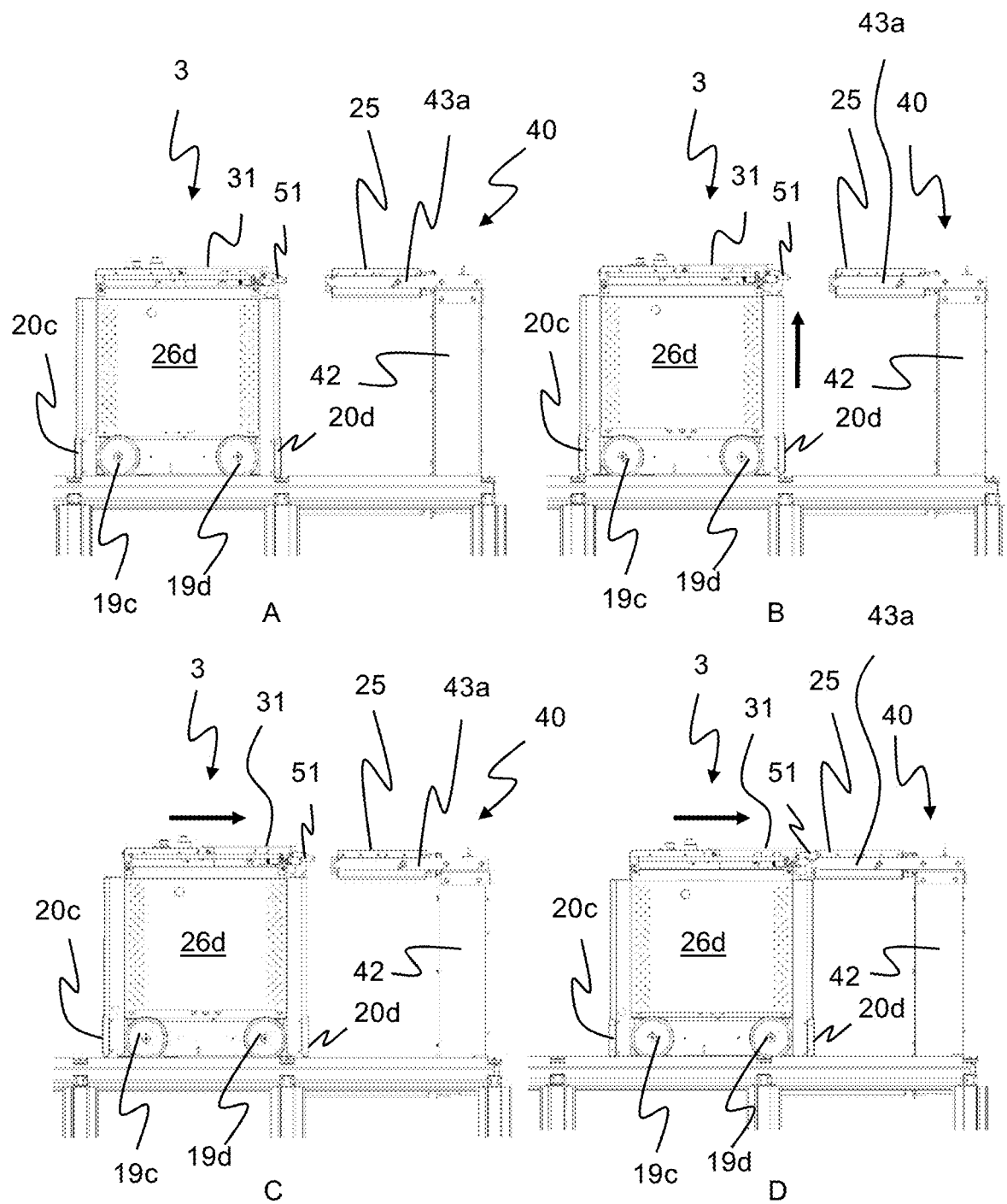

The available charged battery 25 on the second charging station 40 is mounted onto a battery support 43, which in the example shown in FIGS. 14-16 is in form of two guiding pins 43a, 43b extending laterally into the track system from each side of the charging station column's 42 upper end 42b.

When the vehicle 3 is contacting the charging station 40, a release mechanism 50 (see FIG. 17) is activated, allowing the battery cover 31 to be tilted around a rotational axis.

The release mechanism 50 comprises a pivot arm 51 arranged at both sides of the opening of the battery compartment into which the battery 25 is to be inserted.

Further, each of the protruding ends of the guiding pins 43a,43b (constituting the battery support 43) displays a tapered section 52 (see FIGS. 14A and 14C). Upon contact between the pivot arm 51 and the guiding pins 43, a pivot arm contact element 51a of each pivot arm 51 is pushed towards the tapered section 52, thereby enforcing an upward directed pivoting movement of the pivot arm 51 (see FIG. 15A, FIG. 16D and FIG. 17). This pivot movements releases a security lock 51b (see FIGS. 15 and 19) allowing the above mentioned tilt of the battery cover 31.

Figure 17:
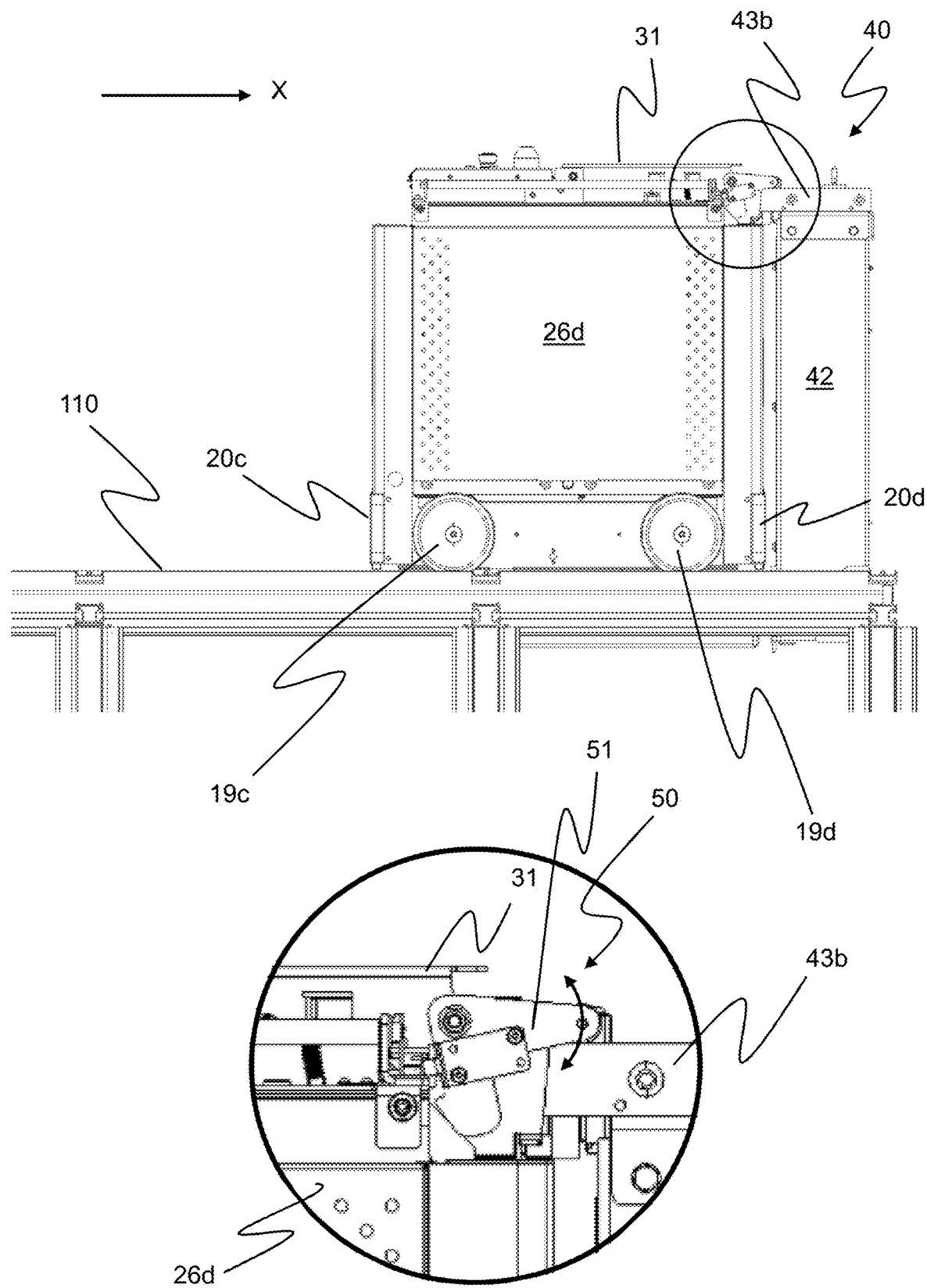

The operation of the release mechanism 50 is illustrated in each of the sequence drawings in FIG. 15 and in FIG. 17. To increase clarity, enlarged area drawings of the release mechanism 50 is added in FIG. 15 A-C and FIG. 15 F. The enlarged area drawings clearly show the activation of the pivot arm movement upon contact with the tapered section 52 moving the security lock 51b away from the battery cover 27 and the subsequent entry of the battery 25.

When the guiding pins 43 with the attached battery 28 has entered a certain distance into the battery compartment 27a (see FIGS. 15 B and C), the guiding pins 43 releases a battery lock 27b, 27c that allows further entry until the battery 25 is fully in its end position within the battery compartment.

Figure 19:
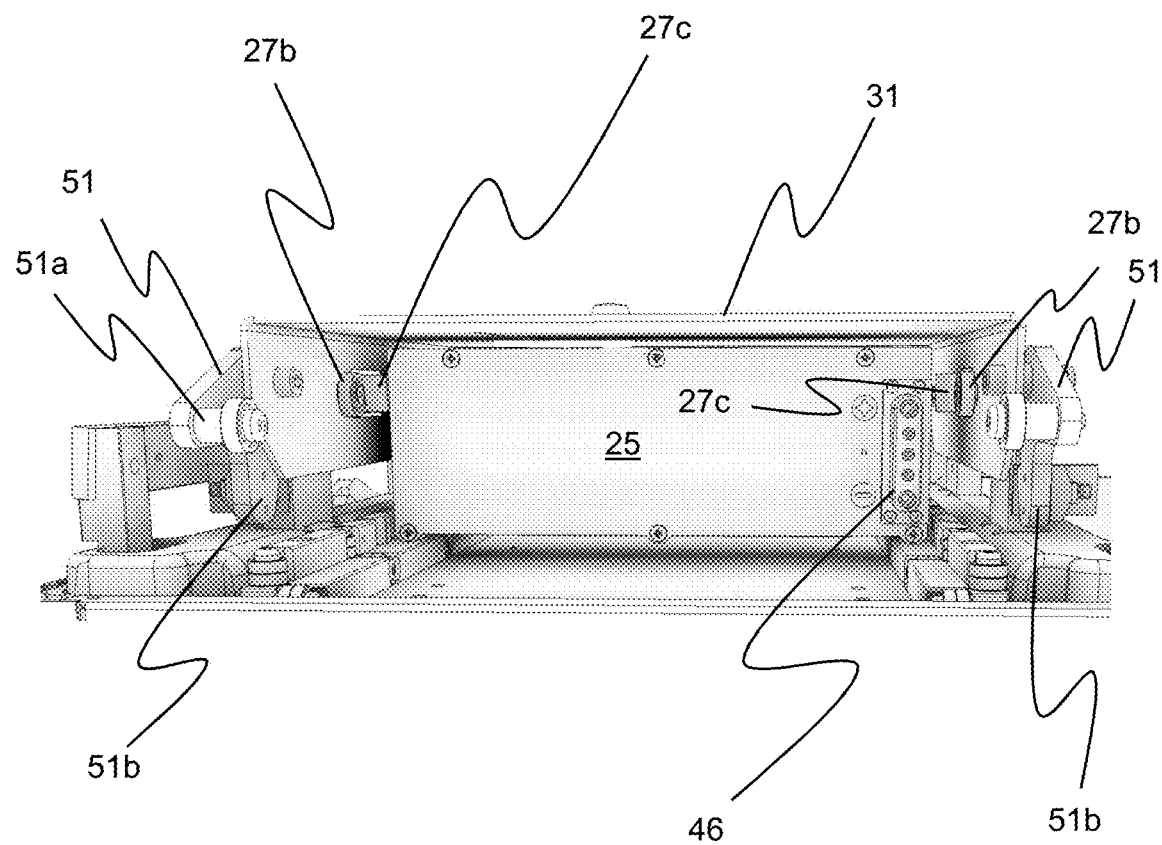

In FIG. 19, the battery lock 27b,c comprises a battery lock activator 27b in the form of a wheel and one or more blocking teeth 27c extending from the inner walls of the battery cover and into the battery compartment. When the tapered ends 52 of the guiding pins 43a,b contacts the battery lock activator 27b, the battery cover 27 is tilted upwards, thereby displacing the one or more teeth 27c such that the battery 25 and the guiding pins 43a,b may continue the movement deeper into the battery compartment.

In this end position, and before retraction of the vehicle 3, the battery 25 can be electrically connected two both the charging station 40 and i.e. the drive motors for the wheels 19a-d,20a-d.

When the battery is in its end position inside the battery compartment and in electrical contact with the corresponding electrical connector of the vehicle 3, the battery compartment tilts back to its initial position such that the teeth 27c physically locks or holds the battery 25 within the battery compartment. As an example, the teeth 27c may enter dedicated recesses 49a within support rails 49 arranged at both sides of the battery 28 (see FIG. 17).

The battery lock 27b,c may be any physical hindrance within the battery compartment. As an alternative to the above-mentioned teeth 27c, the battery lock may comprise one or more protruding wedges that the battery 25 may surpass in one direction, but not in the other. In this configuration, the wedge shape would act as the battery lock activator 27b.

When the battery 25 is in its end position and successfully locked into the battery compartment by the battery lock 27b,c, the second set of wheels 20a-d of the vehicle 3 is lifted from the track system (typically between 5-15 mm), thereby lifting the overall height of the vehicle 3. This operation causes the battery 25 to be released from the battery support 43, for example from dedicated pockets or tracks within the first and second guiding pins 43a,b (see FIG. 14A).

Since now the battery lock 27b,c is locking the battery 25 into the battery compartment, and the battery 25 has been lifted free from the battery support 43, a retraction of the vehicle 3 out of the charging station storage cell leaves the battery 25 electrically connected to the vehicle 3.

In addition to allowing successful exchange of battery, the blocking of the battery 28 into the battery compartment 27a has the advantage that the battery 28 cannot be unintentionally displaced within the battery cover 27 during operation.

When the control system has sent an instruction to the vehicle 3 to place its battery 28 into a charging station 40 for charge, the steps for transferring the battery 28 from the vehicle 3 to the charging station 40 are essentially equal or similar to the opposite sequence and direction of the above-mentioned steps of transferring the battery 28 from the charging station 40 to the vehicle 3.

Hence, the vehicle 3 is first raised to both allow the vehicle to enter the charging station storage cell without interference of the second set of wheels 20 with the tracks 11 in the second direction (Y) and to align the operative battery 25 with the charging plug 45 of the charging station 40. As mentioned above, the charging plug 45 is in the exemplary configuration of FIGS. 14-17 in an upper, unloaded position.

During the approach of the vehicle 3 towards the charging station 40, the wedged ends 52 of the first and second guiding pins 43a,b first activate the tilt of the battery compartment via the release mechanism 51, then activate the battery lock 27b,c causing the battery cover to tilt upwards, thereby removing the blocking teeth 27c from the corresponding recesses 49a in the support rail 49.

By lowering the vehicle 3 towards the track system, the support rails 49 of the battery 28 mesh with the battery support 43. A subsequent retraction of the vehicle 3 would thus leave the battery in the desired charging position on the charging station 40.

To allow larger batteries within the vehicle 3, both the battery cover and the optional release mechanism 50 may be arranged so that they protrude horizontally in the X direction beyond the otherwise generally vertical side walls 26c and 26d. In this way, the overall capacity of each vehicle 3 in the system 1 may be increased significantly without necessitating making the tracks 11,12 wider.

In case there is a need of manual interference for removing the battery from the battery compartment, for example due to general maintenance or accidental battery jamming, a configuration with a protruding release mechanism 50 has an additional advantage in that it allows easy manual unlocking of the battery. That is, the protruding arrangement allows for exertion of sufficient manual force on the release mechanism 50, an operation that would be difficult if for example the release mechanism 50 was arranged deep within the battery cover 27.

The protruding configuration described above is also beneficial for ensuring early engagement in the charging station 40.

An example of a battery 25 is shown in perspective in FIG. 18. One of two support rails 49 is shown protruding from a side wall of the battery 25. And identical support rail is protruding from the opposite side wall. The purpose of the support rails 49 is to both ensure a stable support of the battery 25 on the battery support/guiding pins 43 and to ensure an accurate guiding of the battery 25 into and out of the battery compartment during exchange. FIG. 19 shows the battery 25 with support rails 49 being inserted fully within the battery compartment. In the particular configuration shown in FIG. 19, the battery 25 is approximately half the maximum allowable volume of a battery.

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

The invention claimed is:

1. An automated storage and retrieval system comprising:
   a track system comprising a first set of parallel tracks arranged in a horizontal plane and extending in a first direction, and a second set of parallel tracks arranged in the horizontal plane and extending in a second direction which is orthogonal to the first direction, wherein the first and second sets of tracks form a grid pattern in the horizontal plane comprising a plurality of adjacent grid cells, each adjacent grid cell comprising a grid opening defined by a pair of adjacent tracks of the first set of tracks and a pair of adjacent tracks of the second set of tracks;
   a plurality of stacks of storage containers arranged in storage columns located beneath the track system, wherein each storage column is located vertically below a grid opening;
   a plurality of container handling vehicles for lifting and moving the plurality of stacks of storage containers, the container handling vehicles being configured to move laterally on the track system above the storage columns to access the storage containers via the grid openings, wherein each of the plurality of container handling vehicles has a footprint with a horizontal extent which is equal to or less than the horizontal extent of a grid cell and comprises:
   a lower part comprising a wheel assembly for guiding the container handling vehicle along the track system; and
   a container-receiving storage space arranged within the footprint of the container handling vehicle for accommodating a storage container;
   wherein each container handling vehicle comprises an upper part containing a protruding section which extends horizontally beyond the footprint of the container handling vehicle and the lower part, and, when the container handling vehicle is positioned above a grid cell, into a neighboring grid cell,
   wherein the lower part comprises every part of the container handling vehicle at or beneath a height of the wheel assembly, and
   wherein the protruding section comprises at least one of: a rechargeable battery; a battery slot for housing a replaceable battery; and a sensor for establishing a position of the vehicle on the track system or in relation to other vehicles on the track system,
   wherein the protruding section of each container handling vehicle is configured to extend above a neighboring lower part of a neighboring container handling vehicle in a neighboring grid cell.

2. The automated storage and retrieval system according to claim 1, wherein the wheel assembly comprises a first set of wheels for engaging with the first set of tracks to guide movement of the container handling vehicle in the first direction, and a second set of wheels for engaging with the second set of tracks to guide movement of the container handling vehicle in the second direction.

3. The automated storage and retrieval system according to claim 1, characterised in that the container handling vehicle comprises:
   a lifting device arranged to transport a storage container vertically between a storage position in a stack and a transport position in the storage space, the lifting device comprising:
   a gripping device being configured to releasably grip a storage container; and
   a lifting motor being configured to raise and lower the gripping device relative to the storage space.

4. The automated storage and retrieval system according to claim 1, characterised in that each container handling vehicle comprises a recessed section arranged to accommodate the protruding sections of other container handling vehicles when they operate over a neighbouring grid cell.

5. The automated storage and retrieval system according to claim 4, wherein the recessed section has a shape which is complementary to a shape of the protruding section.

6. The automated storage and retrieval system according to claim 4, wherein the recessed section extends across a whole width or length of the container handling vehicle in a direction which is orthogonal to a direction in which the protruding section extends.

7. A container handling vehicle for an automated storage and retrieval system, the container handling vehicle comprising:
   a lower part comprising a wheel assembly for guiding the container handling vehicle along a horizontal track system of the automated storage and retrieval system, the wheel assembly containing at least two wheels that are orthogonal to each other, and
   a storage space arranged centrally within the lower part for accommodating a storage container of the automated storage and retrieval system,
   wherein the horizontal track system comprises a first set of parallel tracks arranged in a horizontal plane and extending in a first direction, and a second set of parallel tracks arranged in the horizontal plane and extending in a second direction which is orthogonal to the first direction, wherein the first and second sets of tracks form a grid pattern in the horizontal plane comprising a plurality of adjacent grid cells, each adjacent grid cell comprising a grid opening defined by a pair of adjacent tracks of the first set of tracks and a pair of adjacent tracks of the second set of tracks, wherein the container handling vehicle comprises an upper part arranged above the lower part, wherein the upper part comprises a protruding section extending horizontally beyond the lower part, wherein the protruding section comprises at least one of: a rechargeable battery; a battery slot for housing a replaceable battery; and a sensor for establishing a position of the vehicle on the track system or in relation to other vehicles on the system, wherein the protruding section of the container handling vehicle is configured to extend above a neighboring lower part of an identical neighboring container handling vehicle in a neighboring grid cell, and wherein the lower part comprises every part of the container handling vehicle at or below a height of the wheel assembly.

8. The container handling vehicle according to claim 7, further comprising a recessed section arranged to accommodate the protruding section of another container handling vehicle when operating on the track system.

9. The container handling vehicle according to claim 8, wherein the recessed section has a shape which is complementary to a shape of the protruding section.

10. The container handling vehicle according to claim 8, wherein the protruding section and the recessed section are arranged at opposite sides of the container handling vehicle.

11. The container handling vehicle according to claim 7, wherein the wheel assembly comprises wheels which are arranged around a periphery of the storage space.

\* \* \* \* \*